United States Patent [19]
Meir et al.

[11] Patent Number: 6,037,950
[45] Date of Patent: Mar. 14, 2000

[54] CONFIGURABLE, EXTENSIBLE, INTEGRATED PROFILE GENERATION AND MAINTENANCE ENVIRONMENT FOR FACILITATING IMAGE TRANSFER BETWEEN TRANSFORM SPACES

[75] Inventors: Israel Meir, Boston; Mitchell R. Balonon-Rosen, Cambridge; Jay E. Thornton, Watertown; Daniel P. Bybell, Medford; Michael C. Antin, Pepperell; F. Richard Cottrell, South Easton, all of Mass.

[73] Assignee: Polaroid Corporation, Cambridge, Mass.

[21] Appl. No.: 08/844,380

[22] Filed: Apr. 18, 1997

[51] Int. Cl.[7] .................................................. G06F 15/00
[52] U.S. Cl. ............................... 345/431; 345/88
[58] Field of Search ................... 345/431, 153, 345/88

[56] References Cited

U.S. PATENT DOCUMENTS

| | | | |
|---|---|---|---|
| 5,309,257 | 5/1994 | Bonino et al. | 345/431 |
| 5,420,979 | 5/1995 | Madden et al. | 345/501 |
| 5,561,459 | 10/1996 | Stokes et al. | 348/180 |
| 5,572,632 | 11/1996 | Laumeyer et al. | 395/116 |
| 5,612,902 | 3/1997 | Stokes | 364/526 |
| 5,760,913 | 6/1998 | Falk | 358/298 |
| 5,815,642 | 9/1998 | Kumada | 395/109 |
| 5,832,100 | 11/1998 | Lawton et al. | 382/100 |
| 5,838,333 | 11/1998 | Matsuo | 345/431 |

FOREIGN PATENT DOCUMENTS

| | | |
|---|---|---|
| WO 92 06557 | 4/1992 | European Pat. Off. . |
| 0 565 283 | 10/1993 | European Pat. Off. . |
| 0 648 042 | 4/1995 | European Pat. Off. . |
| WO 96 01467 | 1/1996 | European Pat. Off. . |
| 0 785 672 | 7/1997 | European Pat. Off. . |

*Primary Examiner*—Raymond J. Bayerl
*Assistant Examiner*—David E. Brown
*Attorney, Agent, or Firm*—Robert J. Decker

[57] ABSTRACT

A method and system for facilitating image transfer between transform spaces by establishing a configurable, extensible, integrated profile generation and maintenance environment in a computer system includes the steps of providing a profile generation environment, a profile viewing environment, a profile editing environment, and a profile validation environment. The software for implementing the profile generation integrates each of the available environments, is configured to cause a desired sequence of steps to take place, and is extensible by allowing the addition or modification of capabilities without the need to update the main software program in terms of recompilation or relinking.

27 Claims, 8 Drawing Sheets

CONFIGURABLE, EXTENSIBLE, INTEGRATED PROFILE GENERATION AND MAINTENANCE ENVIRONMENT FOR FACILITATING IMAGE TRANSFER BETWEEN TRANSFORM SPACES

BACKGROUND OF THE INVENTION

The present invention relates generally to image processing systems and, more particularly, to methods and devices for generating, viewing, editing and validating profiles linking different transform spaces. In a particularly useful embodiment, the profiles are generated between first and second color spaces where one of the color spaces is associated with either a source or a destination device in an image processing system. The profile can then be utilized within image processing software, or the contents of the profile can be viewed, edited or validated.

Digital image processing involves electronically capturing an image of a scene, altering the captured image in some desired fashion and passing the altered image to an output device. An upstream element of a digital image processing system can be thought of as a source device, whereas a downstream element can be thought of as a destination device. For instance, a simple image processing system could include an image acquisition device such as a digital camera, camcorder, scanner, CCD, etc., a color processor for processing the colors of the image, and an image rendering device, such as a printer, monitor, computer memory, etc. When considering a communication between the acquisition device and image rendering device, the acquisition device is deemed as the source device whereas the image rendering device is deemed as the destination device. All imaging devices impose distortions on both the color and other characteristics of an image.

Transferring images and documents between digital imaging devices such as monitors, scanners and printers requires color matching, i.e. matching of color characteristics of the respective devices since different imaging devices have different color capabilities, describe color characteristics in different terms, and operate in different color spaces. For example, a color display monitor in a computer system may operate in RGB color space by creating and describing colors in terms of red, green and blue (RGB) values. The RGB values associated with particular colors for the display monitor are device-dependent in that the RGB values associated with specific colors are particular for the given monitor. Since the RGB values are device-dependent, colors displayed on different monitors will probably not be visually identical even for the same RGB input values.

Most printers create and describe colors in device-dependent terms differing from those used by monitors. For example, printers use cyan magenta, yellow and black (CMYK) values to describe colors, and are said to operate in the CMYK color space. Since the CMYK values are device-dependent, colors printed on any given printer will probably not match colors printed on a different printer for the same CMYK value.

Further complicating color matching between devices is the fact that different devices have different color capabilities. Every rendering device, such as a printer or monitor, has a limited range of colors, i.e. a gamut, that it can reproduce. Those skilled in the art will recognize that color display monitors tend to be able to produce a wider range of lighter colors whereas color printers tend to be able to produce a wider range of darker colors. Consequently, the gamut for a color display monitor is different from the gamut for a color printer. As a result, some colors displayed on display monitors cannot be reproduced on color printers and vice versa.

Models are often used to translate colors between devices while trying to maintain the perceived color appearance. For example, suppose that the user displays an image on a monitor. If he prints the image without any color matching, the color appearance of the printed image will differ significantly from that of the original. Using a color matching model, this difference can be reduced to a perceptively acceptable level. Color matching models can be empirically or analytically derived.

In recent years, device-independent paradigms for the characterization of color information in an image processing system have been developed and are being implemented. ColorSync, developed by Apple Computer and KCMS, developed by Eastman Kodak Co., are examples of systems or components supporting a device-independent color paradigm. This paradigm is based upon a characterization of the image pixel data (digits) in a device-independent color space, e.g. CIE L*a*b* or CIE XYZ, using a color management system.

U.S. Pat. No. 5,561,459 issued Oct. 1, 1996 to Stokes et al. discloses automatic profile generation for a self-calibrating color display. Cathode ray tube (CRT) parameters are measured and combined with previously acquired calibration parameters in order to create updated characteristic information for the profile. The characteristic information includes the CRT color gamut, the white and black point of the CRT and the gamma of the CRT. In addition, ambient lighting conditions may be included in the profile. This characteristic information is stored in a CRT characterization profile in a standardized format. The profile is updated whenever the CRT is recalibrated or whenever the operating conditions of the CRT are changed. Further, the profile may be employed to recalibrate a destination CRT based on a source CRT's profile.

U.S. Pat. No. 5,612,902 issued Mar. 18, 1997 to Stokes discloses a system and method for automatic characterization of a color printer using an analytical model which, in turn, is used to generate a multidimensional lookup table which can be used at runtime to compensate image input and create desired visual characteristics in the printed image. A detector can be incorporated into the printer which measures at least one parameter of each printed sample so that characterization can be carried out internally to the printer in a manner which is transparent to the end user. In this way, changes in paper stock, inks, or environment can be custom compensated for each printing application.

SUMMARY OF THE INVENTION

A method and system for facilitating image transfer between transform spaces by establishing a configurable, extensible, integrated profile generation and maintenance environment in a computer system includes the steps of providing a profile generation environment, a profile viewing environment, a profile editing environment, and a profile validation environment. The software for implementing the profile generation and maintenance integrates each of the available environments, is configurable to cause a desired sequence of steps to take place, and is extensible by allowing the addition or modification of capabilities without the need to update the main software program in terms of recompilation or relinking.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein.

DETAILED DESCRIPTION OF THE PREFERRED EMBODIMENTS

Figure 1:
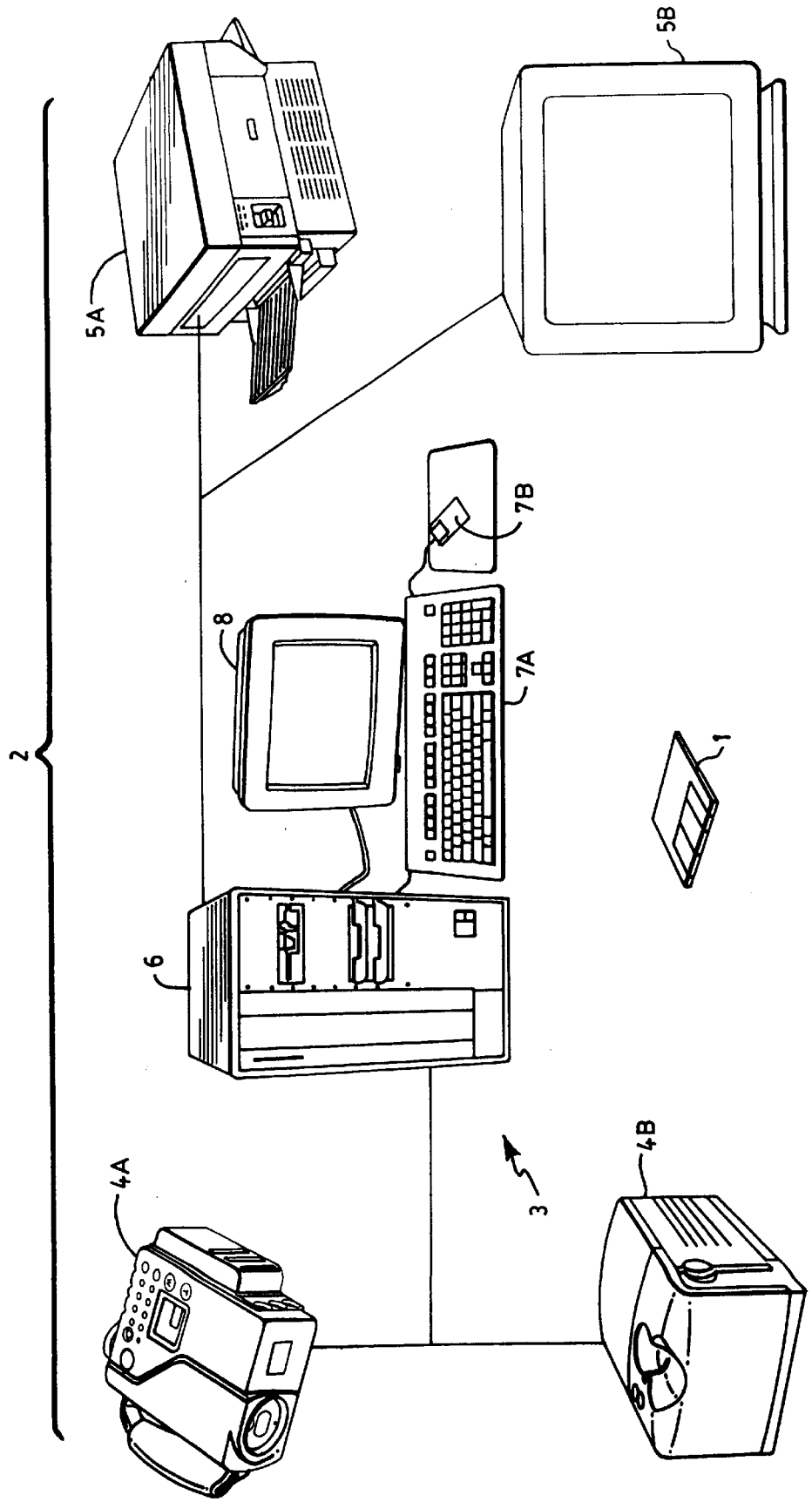
FIG. 1 is a block diagram of a basic digital image processing system.

The characterization of a device's image pixel data in device-independent color space is commonly codified in a tagged file structure, referred to as a device profile, that accompanies the digital imaging device. A device profile is standardized and defined as "a digital representation of the relation between device coordinates and a device-independent specification of color" in the International Color Consortium (ICC) Profile Format Specification, Version 3.3, Nov. 11, 1996, page 101 incorporated herein in its entirety for supplemental background information which is non-essential but helpful in appreciating the applications of the present invention.

A standard ICC profile includes header information, a tag table and tagged element data. The profile header provides the necessary information to allow a receiving system to properly search and sort ICC profiles. The header includes, but is not limited to, the following parameters: size; color management module (CAM) type; version number; device class; color space; connection space; creation date and time; file signature; primary platform target; flags; device manufacturer; device model; device attributes; rendering intent; XYZ values; and the name of the creator. These parameters are further described below.

The profile size is given in bytes. The CMM, profile version number and device class are each identified. The three basic device profile classes are input, output and display. Profiles are also classified as device link, color space conversion, abstract or named color profiles. Device link profiles provide a mechanism in which to save and store a series of device profiles and non-device profiles in a concatenated format as long as the series begins and ends with a device profile. Color space conversion profiles are used as a convenient method for CMMs to convert between different non-device color spaces. Abstract color profiles provide a generic method for users to make subjective color changes to images or graphic objects by transforming the color data within a profile connection space (PCS) to be described later. Named color profiles are related to device profiles so that, for a given device there would be one or more device profiles to handle process color conversions and one or more named color profiles to handle named colors. The color space of the data stored in the profile could be any color space such as XYZ, L*a*b*, Luv, RGB, CMY, CMYK, etc. Further, the profile connection space can be any device-independent color space such as XYZ or L*a*b*. The primary platform signature indicates the primary platform or operating system for which the profile was created. The profile flags indicate various hints for the CMM such as distributed processing and caching options. The device attributes are noted which are unique to the particular device setup such as the media type. The rendering intent is either perceptual, relative colorimetric, saturation or absolute colorimetric.

The tag table acts as a table of contents for the profile tags and the tag element data therein. Each profile classification requires a different set of tags. Of course, the intent of using tags with profiles is to provide a common base level of functionality. One example of a tag is the calibrationDateTimeTag which provides profile calibration date and time. Initially, this tag matches the contents of the creationDateTime header flag. This allows applications and utilities to verify if this profile matches a vendor' profile and how recently calibration has been performed. Another example of a tag is the mediaWhitePointTag which specifies the media white point and is used for generating absolute colorimetry. It is referenced to the profile connection space so that the media white point as represented in the profile connection space is equivalent to this tag value. Many other profile tags are available as described in the ICC specification.

The ICC specification further defines a Profile Connection Space (PCS) as a device-independent color space which can be used as a standard intermediary color space for transforming color information from one device-dependent color space to another (e.g. RGB to CMYK). For example, the transformation of a color image from a digital camera to a printer can be described as a transformation into the PCS via the digital camera's profile followed by a transformation out of the PCS via the printer's profile. The PCS, however, is a virtual space so that the image may never actually be represented in the PCS on disk or in a computer memory. Thus, the PCS is regarded as a virtual stage of the image processing in contrast to an interchange or exchange color space, which is an encoding for the storage and transmission of images.

The inclusion of non-color, spatial information into profiles is disclosed in U.S. patent application Ser. No. 08/709, 487 filed Sep. 6, 1996 by Hultgren et al., herein incorporated by reference in its entirety for supplemental background information which is non-essential but helpful in appreciating the applications of the present invention. Spatial information can be represented, for instance, by private spatial tags under the ICC recommendations. The spatial tags should include information as to which class the particular characteristic function belongs, i.e. Modulation Transfer Functions, Wiener Noise Power Spectra, or gray level dependent Wiener noise masks. The tagged format should also include information sufficient to identify both the relevant units of spatial frequency and the dimensionality of the characteristic functions. Propagation of characteristic functions is calculated within the context of the model based image processing system.

Although the specification of the International Color Consortium as described above provides a specific profile definition, a profile generated and maintained in accordance with the principles of the current invention is not so limited. First, as noted above, the profile considered herein is not singularly directed towards characterization of color data. Spatial and other profile data is also viable. Also, a profile generated and maintained in accordance with the principles of the current invention is more accurately defined as characteristic information for use in image processing which facilitates the transfer of information from one transform space to another. For instance, a profile can be generated to transform image data: from device-dependent color space to device-independent color space; from a first device-dependent color space to a second device-dependent color space; from device-independent color space to device-independent color space; from a first device-independent color space to a second device-independent color space; from a first device-dependent color space to a second device-dependent color space; etc.

Generation and maintenance of profiles are significantly simplified by configurable, extensible, integrated software which implements the features of the invention to include interactive and script driven processes for facilitating the generation, viewing, editing and validating of profiles. A script is defined as a type of program that consists of a set of instructions to an application or utility program or its operating system environment, can initiate user prompts and has the ability to react to user and software action. It is well known that a script typically includes instructions expressed using the rules and syntax of the application or utility and its operating system environment, combined with simple control structures such as loops and if/then expressions. Two sample scripts useful for implementing profile generation in accordance with the principles of the invention append this description.

For the purposes of the invention, the software program is integrated. For this case, integrated means that the software program contains all or some of the following: a profile generation environment, a profile viewing environment, a profile editing environment and a profile validation environment. The profile generation environment has many features built into it which are necessary for the interactive building of a profile from raw or previously processed data: extensive data acquisition screens and features; data validation steps; capabilities to receive images either from file or directly from image acquisition devices; capabilities to send images either to file or to image rendering devices; capabilities to receive data either from file or directly from measurement devices such as a spectrophotometer for measuring color; ability to receive from the user other useful data; features for reformatting and applying simple processing to data; capabilities to send raw, reformatted or processed data to data computation modules and to receive results from those modules; ability to create a profile structure and populate its substructures with raw, reformatted or processed data. The profile generation environment also has the ability to store in a history file documentation of how the profile was produced, such information can include the raw and/or processed data and instruction sequence used in the profile generation. The profile viewing environment possesses means to present to the user in a useful fashion all of the fields of the profile header and any profile tag of interest. For tags with structure unknown to the viewing environment, text and/or binary representations of the data are available. The profile editing environment possesses a means to present to the user in a useful fashion the current state of all the fields of the profile header and any profile tag of interest and the capability for user interactive modification of the contents of any of the fields in user-friendly fashion. For tags with structure unknown to the editing environment, text and/or binary editors are available. The profile validation environment contains means to verify the reasonableness and accuracy of the profile. Validation processes may report profile metrics based on testing of the self-consistency of the profile, testing of the consistency between the profile and the raw data used in its generation and/or testing the accuracy of results obtained by exercising the profile in an image processing environment.

For the purposes of the invention, the software program is configurable. For this case, configurable means that the software program can be controlled in such a way as to cause a well defined sequence of steps to take place, including user prompts, which result in a simplified procedure for profile generation and/or profile editing and/or profile validation. The knowledge of an expert can be encapsulated in a script which when running sends instructions to the software program or its operating system environment guiding an arbitrary user through the complexities of the profile generation, editing and/or validation task.

For the purposes of the invention, the software program is extensible. For this case, extensible means that new capabilities can be added to the environments of profile generation, profile viewing, profile editing and profile validation without the need to update the main software program in terms of recompilation or relinking. In the profile generation environment, new software compilation or data processing modules, such as a model based module which can utilize fewer color patch samples, can be easily added by the user or a third-party developer through adherence to a well defined application programmer's interface. The profile viewing and editing environments will react to descriptions of new tag structures written with adherence to a defined syntax, such descriptions easily added by a user or a third-party developer. In the profile validation environment, new capabilities can also be added by the user or third-party developers.

FIG. 1 is a diagram of an image acquisition and rendering system, also referred to as a computer system, 2 that can be used in cooperation with, and for implementing, the inventive system and method. The system 2 includes a computer 3, one or more image acquisition or source devices represented by a digital camera 4A and a scanner 4B for acquiring an image and converting it to digital image data, and one or more image rendering or destination devices represented by a color printer 5A and a video output or monitor 5B for generating an output image. The computer 3, which in one embodiment is a general-purpose stored-program digital computer, is capable of receiving and processing digital image data.

As is conventional, the computer 3 includes a processor module 6 and operator interface elements comprising operator input components such as a keyboard 7A, a mouse 7B and a video display device 8. The processor module 6 includes, for example, processor, memory and mass storage devices such as disk and/or tape storage elements (not separately shown) which perform processing and storage operations in connection with digital data provided thereto. The computer 3 will generally be processing certain programs which could be stored and retrieved from the hard drive or a computer-readable medium 1 such as a magnetic diskette or a CD-ROM, which enable it to perform selected image processing operations as described throughout the specification. The operator input elements 7A and 7B are provided to permit an operator to input information for processing. The video display device 8 is provided to display output information to the operator. Although one embodiment of the image acquisition and rendering system 2 is shown as comprising particular components, it will be appreciated that the computer system 3 may include a variety of components in addition to or instead of those depicted in FIG. 1, such as special-purpose hardware and/or program components, or a combination of a computer 3 with special-purpose hardware and/or program components.

Figure 2:
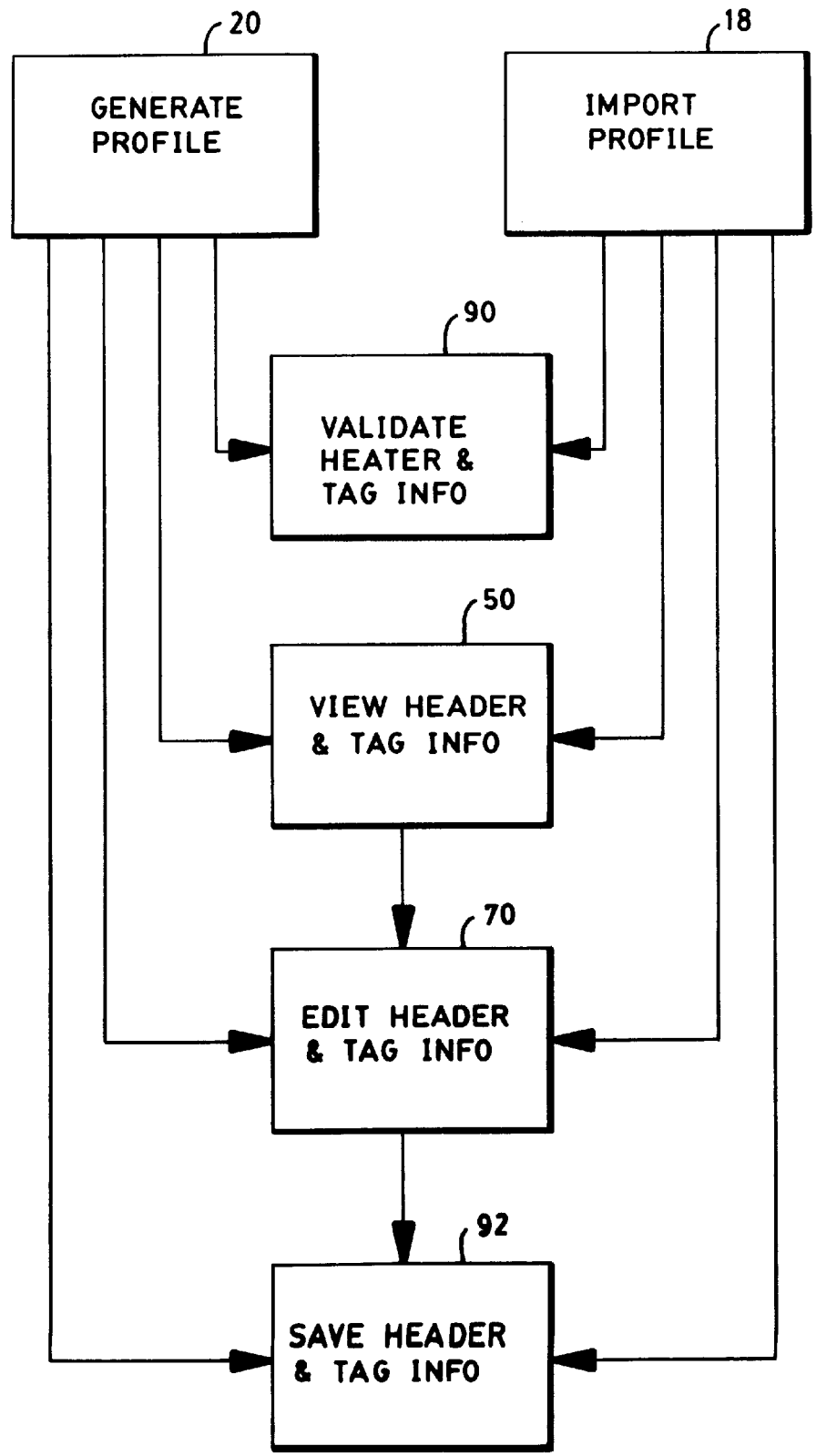
FIG. 2 is a block diagram of an overview of a configurable, extensible, integrated profile generation and maintenance environment for facilitating image transfer between transform spaces in accordance with the principles of the invention.

FIG. 2 is a block diagram of a preferred overview of a configurable, extensible, integrated profile generation and maintenance environment for facilitating image transfer between transform spaces in accordance with the principles of the invention. A profile can either be imported from an external file, application or device in block 18, or generated in block 20. Once the profile is either generated or acquired, it can be viewed in block 50, edited in block 70, validated in block 90, or saved in block 92.

Figure 3:
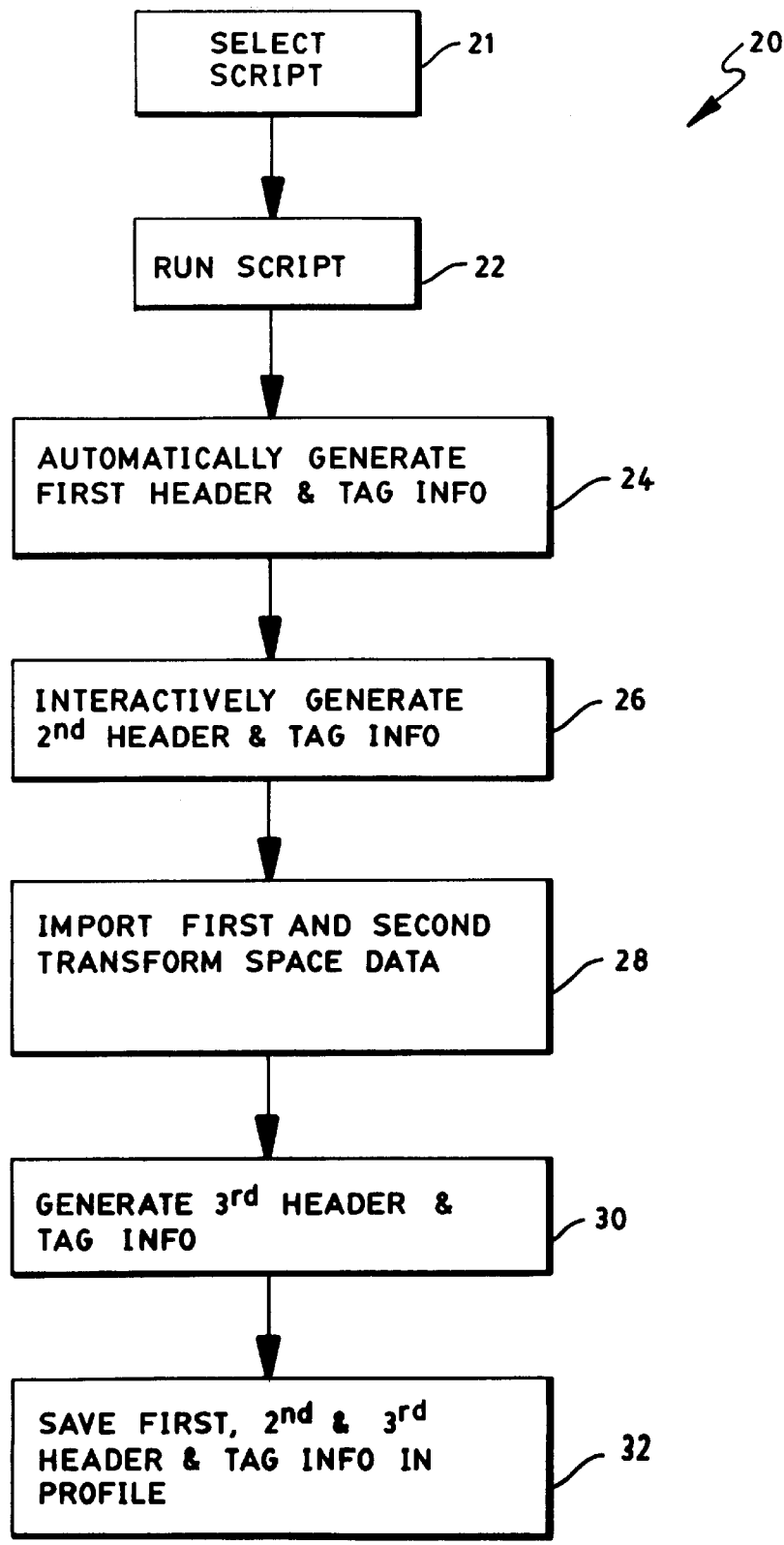
FIG. 3 is one embodiment of the profile generation block of FIG. 2.

FIG. 3 is a flow chart of one example for profile generation according to the principles of the invention. In block 21, the user selects one or more script(s), for example corresponding to a Polaroid PDC-2000 digital camera 4A, from a predefined list. After the user selects the script(s), he executes the selected script(s) in block 22. For the purposes of this example, the profile when generated will contain header and tag information which is conveniently divided into first, second and third header and tag information. In block 24 a utility routine is called by the selected script(s) to automatically generate the first header and tag information such as the profile version, device manufacturer, device model, etc. Then in block 26 an application is run by the script(s) which prompts the user to select and/or fill in data for the second header and tag information which includes entries such as the identity of the profile creator or user, color space signatures, attributes, rendering intent, etc. In block 28, first and second transform space data, which may consist of the null set, is imported which is used for generating in block 30 the third header and tag information such as blueTRCTag, greenColorantTag, mediaWhitePointTag, etc. The first, second and third header and tag information is saved in the newly generated profile in block 32.

Figure 4:
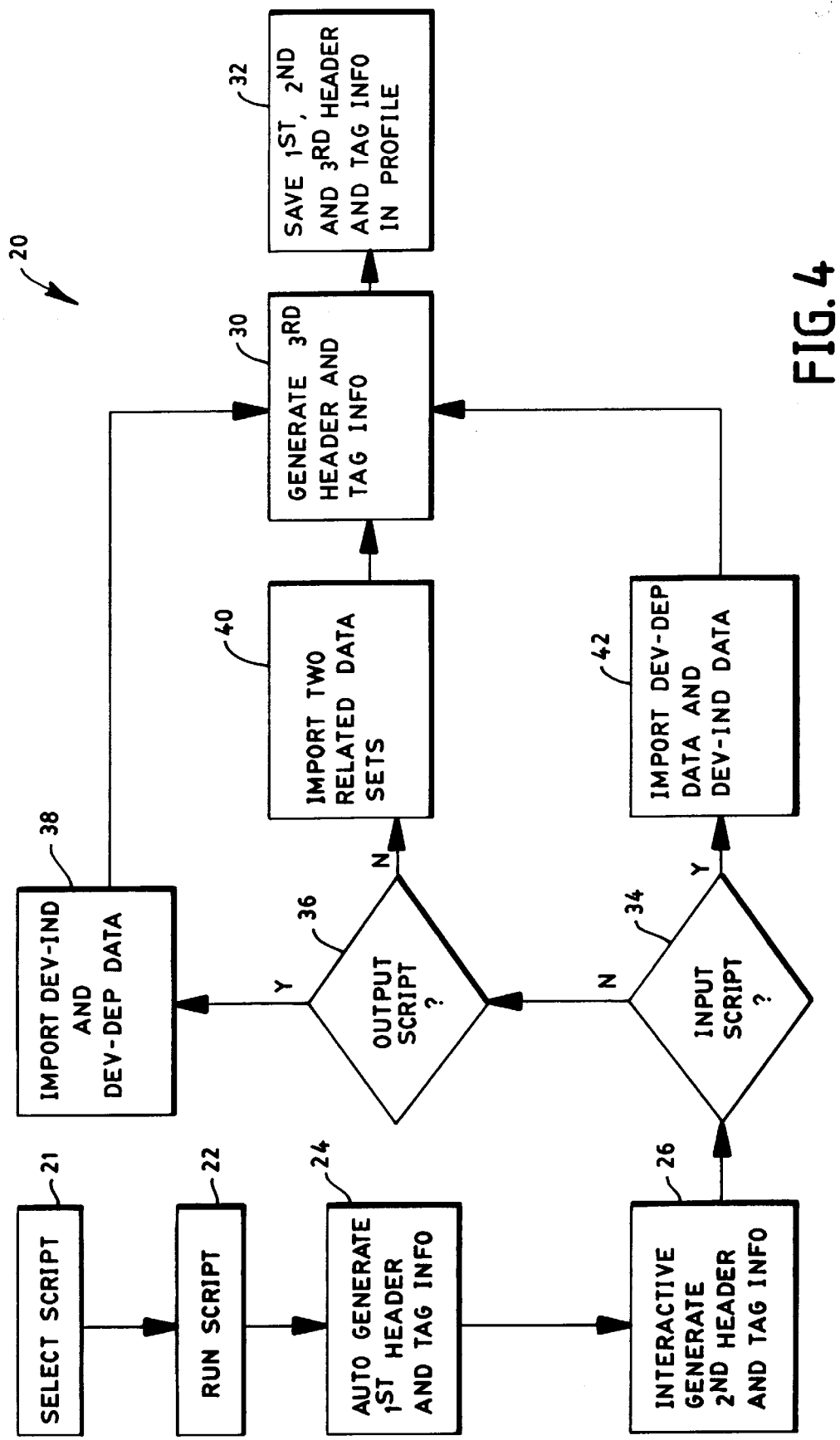
FIG. 4 is another embodiment of the profile generation block of FIG. 2.
Figure 7:
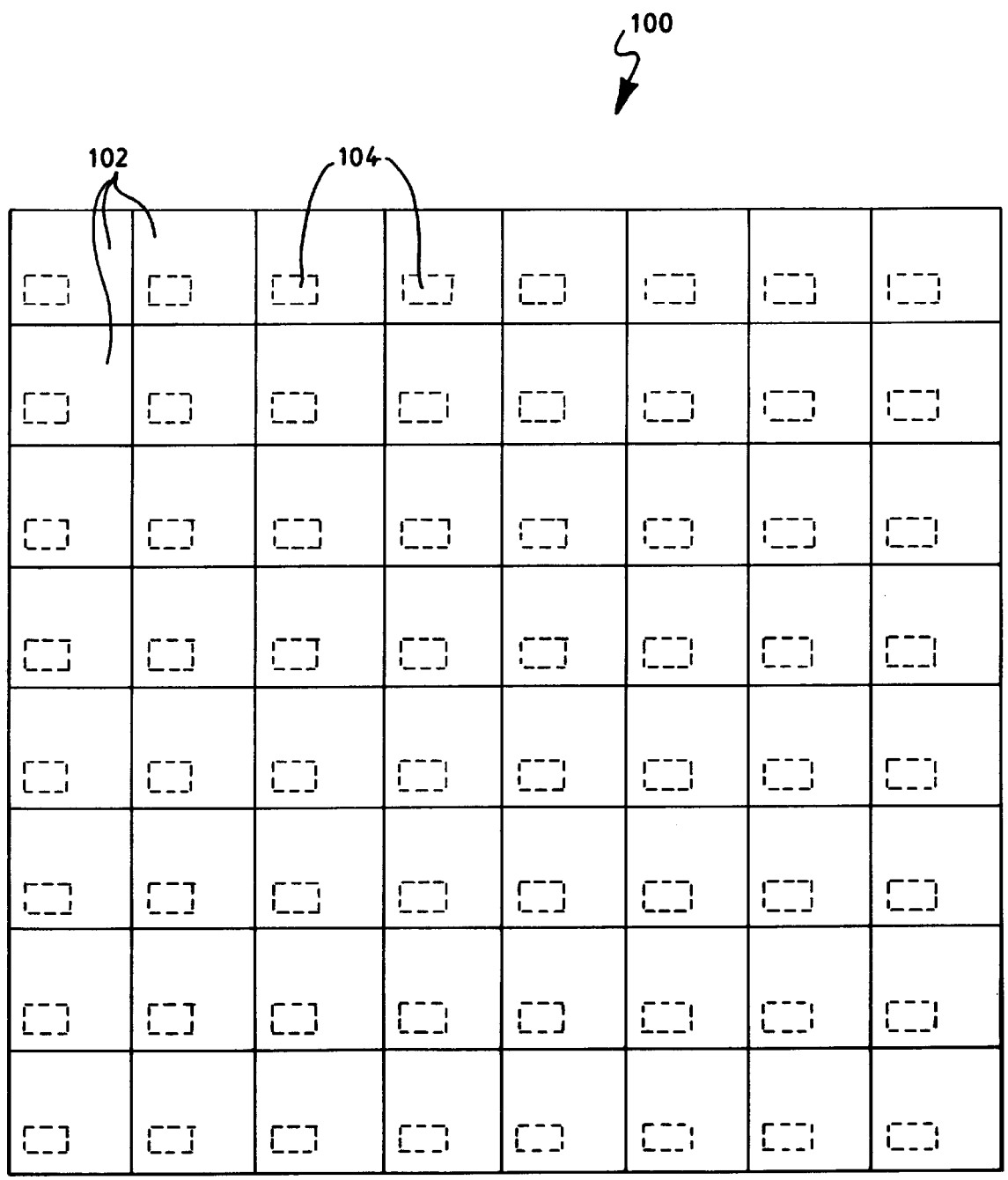
FIG. 7 is a target image of color patches for acquisition by a source device during profile generation.

In the embodiment of FIG. 4, if the selected script(s) is associated with a source device as queried in decision block 34, then the first transform space can, for example, be defined as device-dependent color space and the second transform space can be defined as device-independent color space. For instance, if the chosen script(s) is associated with the PDC-2000 digital camera, then when a target 100 having color patches 102 as illustrated in FIG. 7 is acquired by the camera, the RGB values in RGB space are averaged for each color patch 102. In this case, the target 100 consists of 64 color patches 102 each including an averaging area 104 which shows the user the position and size of the averaging areas 104 that will be used to average color information within each color patch. The size and location of the averaging areas 104 can be modified by the user. The L*a*b* values associated with each patch in L*a*b* space are also imported in block 28 for use in block 30 for generating the third header and tag information.

Figure 8:
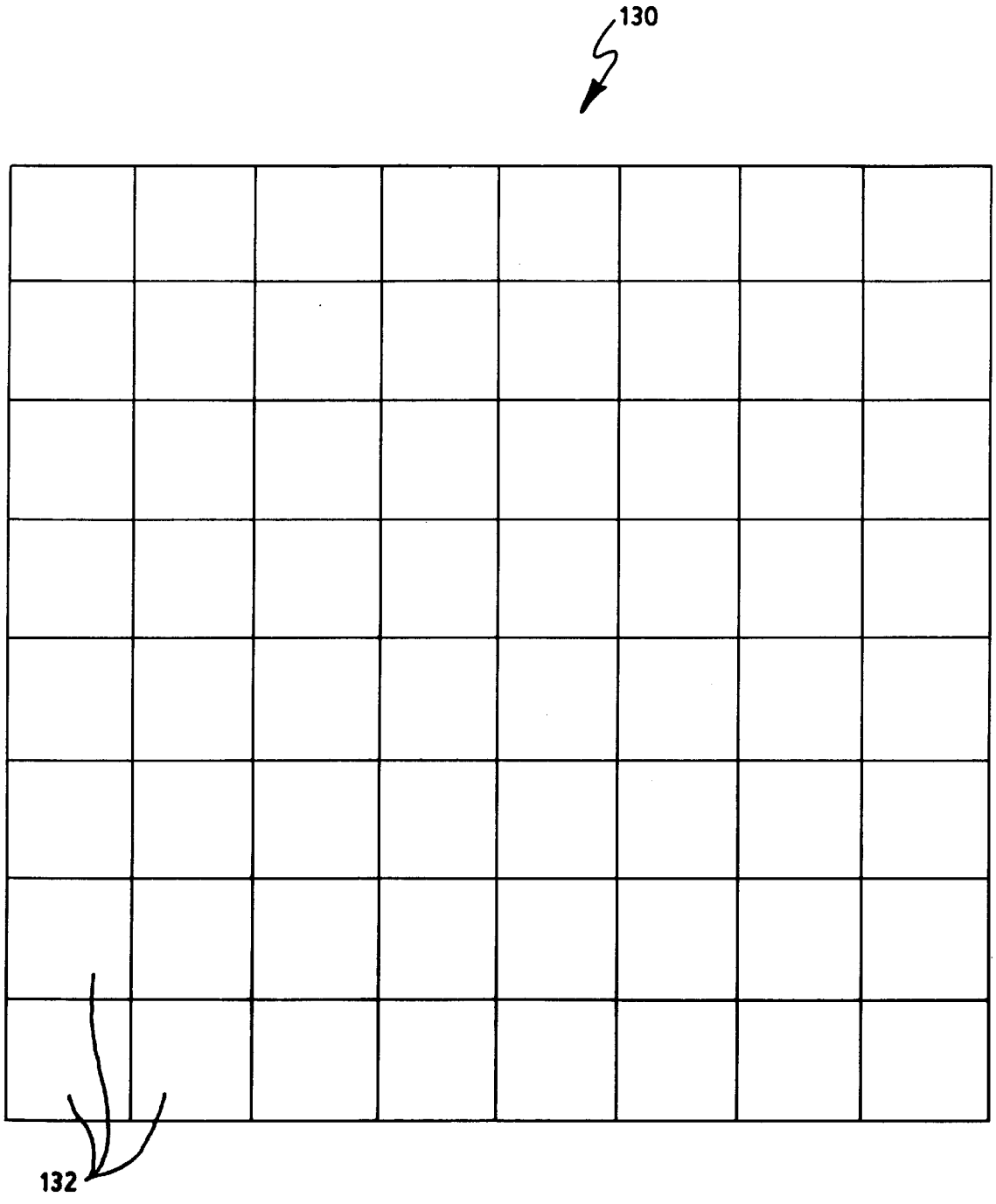
FIG. 8 is an image having color patches which has been exported or rendered by a destination device during profile generation.

In the case where the selected script(s) does not associate with a source device, then decision block 34 in FIG. 4 is answered in the negative and block 36 queries whether the selected script(s) associates with a destination device. If the selected script(s) does associate with a destination device, then in block 38 both device-independent data and device-dependent data are imported. This is accomplished by rendering a color image such as target 130 in FIG. 8 through the destination device such as a color printer. The device-dependent data is expressed in a chosen device-dependent color space such as CMYK color space and the device-independent data is expressed in a chosen device-independent color space such as L*a*b* color space. Thereafter, both the CMYK and L*a*b* values are utilized as previously described to generate the third header and tag information in block 30 which, in turn, is saved in the profile in block 32.

In the case where block 36 is answered in the negative, then the script will guide the user in block 40 through the acquisition of two related color sets, either one of which could consist of the null set. In block 30, the color set data is then used to generate the third header and tag information which, in turn, is stored in block 32.

Figure 5:
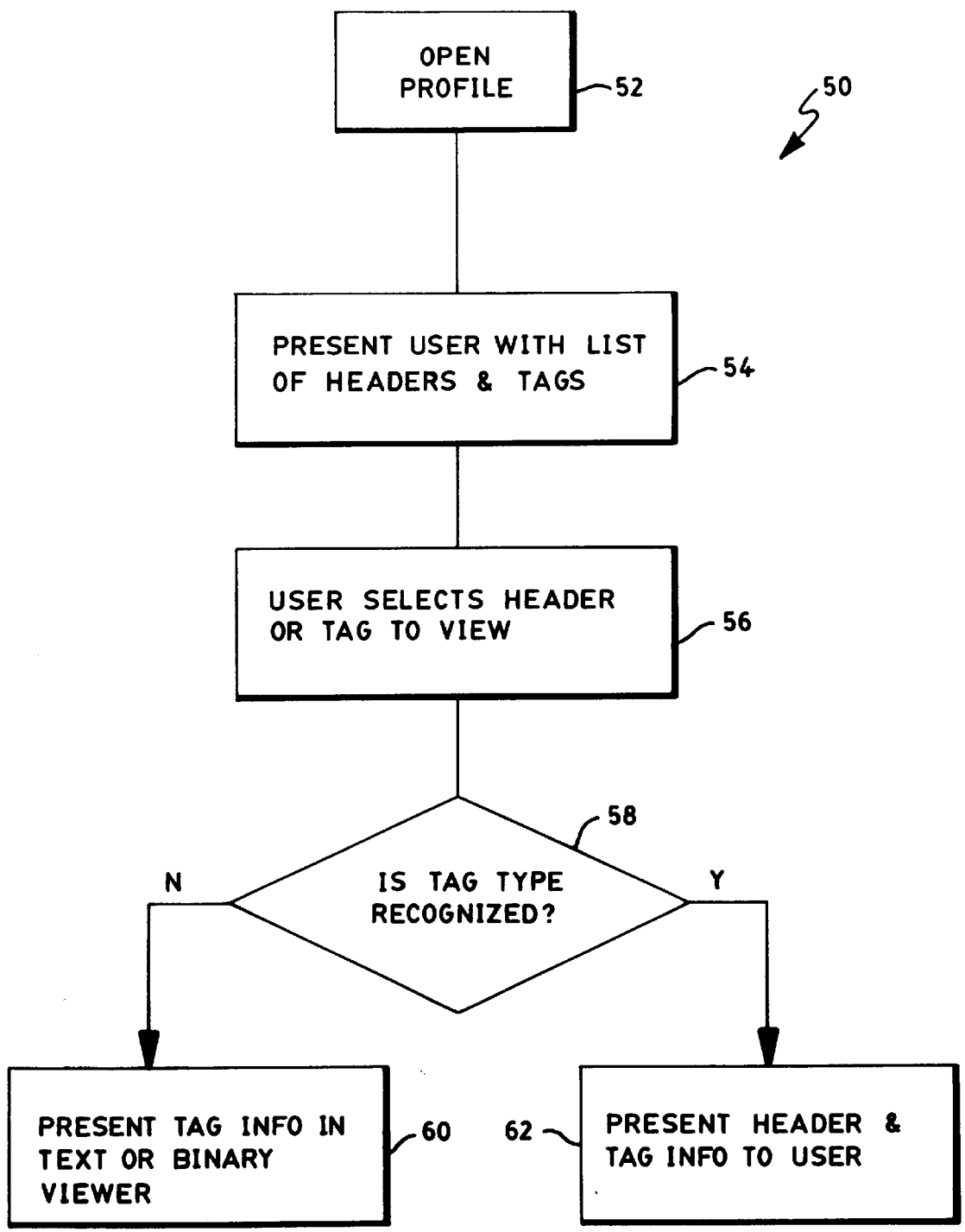
FIG. 5 is one embodiment of the viewing block of FIG. 2.

FIG. 5 is a block diagram of one embodiment of the viewing block 50 of FIG. 2. The user selects a profile which is opened in block 52 and displayed by a list of headers and tags in block 54. The user selects a particular header or tag for viewing in block 56 and the software determines in decision block 58 whether the tag type is recognized for retrieval. The header is always recognizable so for any header selected by the user, the decision block 58 is bypassed and the header information is displayed to the user in block 62. If the tag type is recognized, then the particular tag information is retrieved and displayed to the user in some useable format in block 62. If the tag type is not recognized by the software, then the tag information is displayed in block 60 to the viewer in text or binary format.

Figure 6:
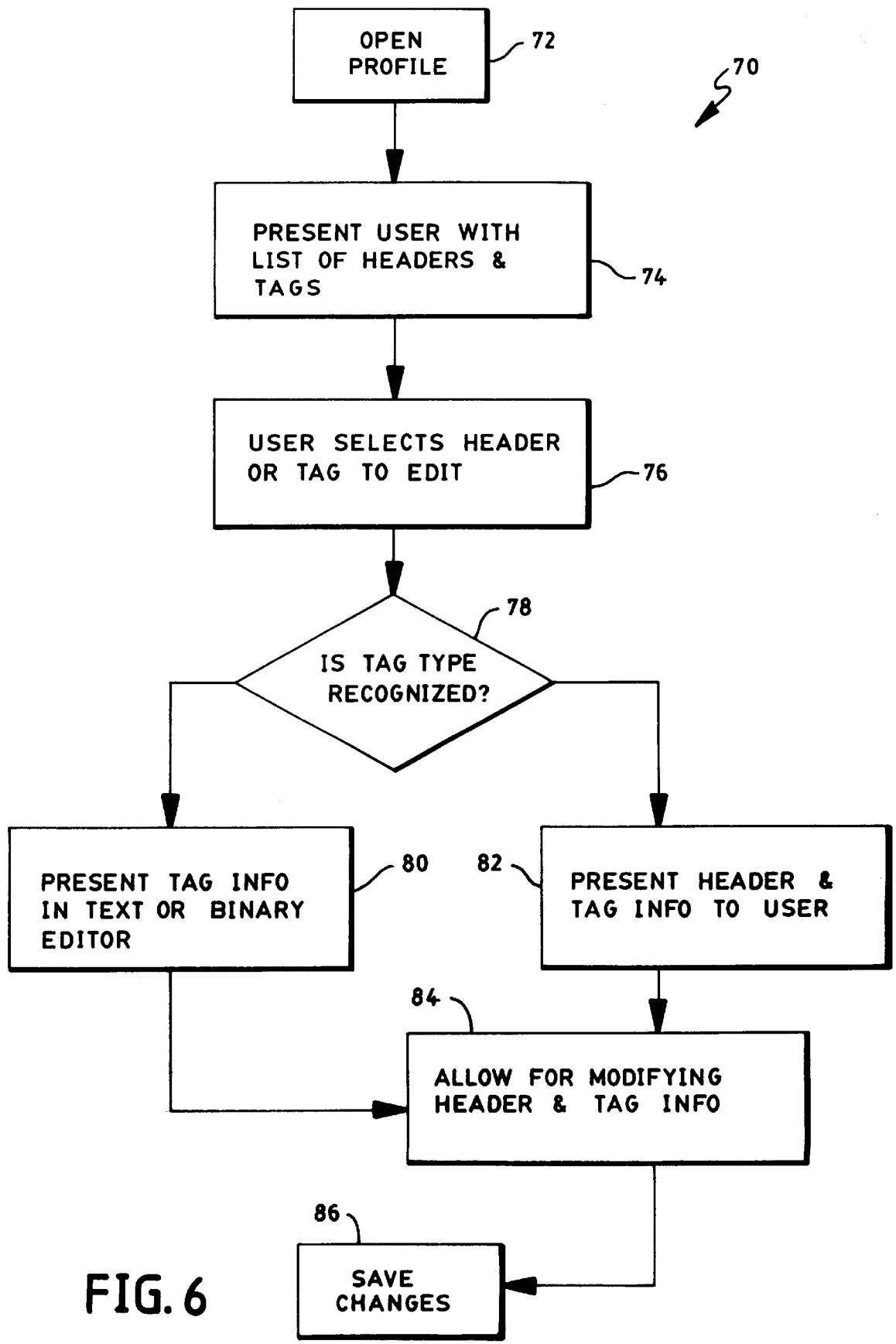
FIG. 6 is one embodiment of the editing block of FIG. 2.

FIG. 6 is a block diagram of one embodiment of the editing block 70 of FIG. 2. As in the viewing block 50, the user first selects a profile which is opened in block 72 and displayed by a list of headers and tags in block 74. The user then selects a particular header or tag for viewing and editing in block 76 and the software determines in decision block 78 whether the tag type is recognized for retrieval. The header is always recognizable so for any header selected by the user, the decision block 78 is bypassed and the header information is displayed to the user in block 82. If the tag type is recognized in block 78, then the tag information is retrieved and displayed to the user in some useable format in block 82. If the tag type is not recognized by the software, then the tag information is displayed in text or binary format in block 80 to the viewer. The user can then modify the header or tag information in block 84 and save the changes in block 86.

Of course, the means for performing various functions in accordance with the invention could be interpreted in a number of ways including numerous combinations of hardware and software components and as such is not limited to specific structures. For instance, something as simple as the means for selecting a profile could be interpreted to include a monitor for displaying the list of possible profiles to the user, a computer program running in RAM within the computer or from a CDROM, the user input device such as a keyboard or mouse, the various scripts used for implementing the selection process, etc. On the other hand, the selection means could alternatively be interpreted merely as a user prompt and acceptance of a user selection by the program being run.

It is to be understood that the above described embodiments are merely illustrative of the present invention and represent a limited number of the possible specific embodiments that can provide applications of the principles of the invention. For instance, the profile making capabilities of the inventive method can be used for providing transformation of data between any two transform spaces. The above examples using first and second color spaces are exemplary. Numerous and varied other arrangements may be readily devised in accordance with these principles by those skilled in the art without departing from the spirit and scope of the invention as claimed.

-- SAMPLE SCRIPT 1
property scriptName: "Sample Device Script"
property scriptVersion: 1.0
tell front document of application "ProfileMaker"
    -- Set the device parameters.
    set device to {name:"sample Device", type:Output, maker:"PLRD",
    model:"0000", media: "Output Media", space:RGBData, print area: {800,
    1000}, resolution:
    {100, 100}, LUT indicies:256, tolerance:3.0, background:
    {65535, 65535, 65535}, PCS:labData, dev time:0}
    -- Add a profile description tag of the device name and current date
    make new tag at end of profile 1 with properties ~
        {signature:profileDescriptionTag, type:textDescriptionType,
data:"Sample Device (100 dpi, Output Media)"}
    make new tag at end of profile 1 with properties
        {signature:polaPixelPitchTag, type: polaPitchType, data: {0.254,
0.254}}
    -- The kodak device settings, a text tag. Not sure what to put in here, so just
put in something simple.
    make new tag at end of profile 1 with properties ~
        {signature:kodakDeviceSettingsTag, type:textDescriptionType,
data:"For best results use . . . (additional settings info)"}
    set prismStr to"*Media: Output Media" & return &"*Resolution: 100 dpi"
& return
    make new tag at end of profile 1 with properties ~
        {signature:polaInformationTag, type:polaSecureTextType,
data:prismStr }
    make new tag at end of profile 1 with properties ~
    {signature:deviceMfgDescTag, type:profileDescriptionTag,
data: "Polaroid Corporation"}
    make new tag at end of profile 1 with properties ~
        {signature: deviceModelDescTag, type:profileDescriptionTag,
data:"0000"}
    make new tag at end of profile 1 with properties ~
        {signature:technologyTag, type:signatureType, data: "XYZ"}
end tell
-- SAMPLE SCRIPT 2
-- Setup disables any datasets that are not color and enables the color ones.
-- Computes the Tags for a color output device using the 8x8x9 targets.
-- This is currently restricted to one target in the Mix A format.
-- Includes the rms of the standard deviations along with the max stdev of the
repeated patches.
property scriptName: "Sample Procedure"
property scriptVersion: 1.0
property minVersion: 1.0
property illum: {0.9253616, 1.0, 0.858086} -- The Sylvania D50 illuminant.
property computeCode: −4500
property validateCode : −4501
property incrementList: {36.429, 36.429, 36.429, 36.429, 36.429, 36.429, 36.429}
property incrementList2: {36.0, 36.0, 36.0, 36.0, 36.0, 36.0, 39}
-- Factors for limits on the standard deviations of the repeated patches, a list of lists.
The items are
-- Mean, stdev, min, max, and rms. Within each it is L, a, b, E. Blank lists are not
checked.
-- The numbers multiply the tolerance in the device record.
property dLimits: {{0.7, 0.7, 0.7, 1.0}}
on GetPMFolder( )
    get path to application "ProfileMaker"
    tell application "Finder" to get container of result
    return (result as text)
end GetPMFolder
validate( )
on setup( )
    tell front document of application "ProfileMaker"
        get every dataset whose name is "Color Output 8x8x9"
        if (count result) is 0 then
            -- create the color space data sets
            make new dataset at end ~
            with properties ~
            {type:Color Space, layout:{8, 8, 9}, patch size:{40,
40}, color source: {category:Resource, name:"8x8x9 [mix A]"}, LUT source:~
                {category:Resource, name: "NULL"},
name: "Color Output 8x8x9", lab source:~
                {category:PR 650}, state:0}
        end if
    end tell
    return 0
end setup
-- This computes the tags for the mix A targets. It is set up to handle only -continued

```
-- one dataset for now. It also does not incorporate any data from the LUT 96 target.
on compute( )
    set baseName to (path to temporary items folder as text) & (time of (current
date) as text)
    set dataPath to GetPMFolder( ) & "data:Output:"
    -- Create temp file name for the clut data of the A to B tags
    set tA2B0 to (baseName & ".tA2B0")
    set tA2B1 to (baseName & ".tA2B1")
    set tA2B2 to (baseName & ".tA2B0") Make the same as Intent 0
    set tInvIn0 to (baseName & ".tinvIn0")
    set tInvIn1 to (baseName & ".tinvIn1")
    -- Create temp file name for the data for the inverse clut data. This is for the
B to A
    -- tags and is a scaled-integer version of the invert3D output.
    set tB2A0 to (baseName & ".tB2A0")
    set tB2A1 to (baseName & ".tB2A1")
    set tB2A2 to (baseName & ".tB2A0") -- Make the same as Intent 0
    set tGamutOut to (baseName & ".gamutout")
    -- Some file(s) are needed to run this script. They MUST be stored in a folder
called
    -- "Data:Output" that is in the same folder as ProfileMaker. Construct this
path here.
    set tGoalSpace to (dataPath & "17CubedLabGoals.v1")
    set tA2BInLut to (dataPath & "A2BInlut888.v10")
    set tNullLut3 to (dataPath & "NullLut3.v10")
    set tNullLut1 to (dataPath & "NullLut1.v10")
    tell front document of application "ProfileMaker"
        activate -- for faster response
        get device
        set tolr to tolerance of result
        set |dset| to first dataset whose enabled is true
        tell |dset|
            set labValues to lab
            set dName to name
        end tell
    end tell
    -- Now average the repeat neutral points. Create a list of the points. Average
them. Compute the L, a, b, and E terms.
    -- Use RMS.
    set deviations to { }
    set root3 to square root of 3
    repeat with i from 0 to 7
        set theFirst to i * 73 + 1
        set theRest to i * 8 + 513
        set theList to {item theFirst of lab Values } & (items theRest thru
(theRest + 7) of lab Values)
        set ans to average theList -- mean, stdev, rms for one gray level
        set theMeans to mean of ans
        copy theMeans to item theFirst of lab Values -- copy mean back into
original 512 area
        set theOffset to { }
        repeat with j from 1 to 3
            set theOffset to theOffset & -(item j of theMeans as real) --
need the as real if theOffset is a negative number. Applescript error!
        end repeat
        -- compute the difference between the mean and each item in the list.
Then get the RMS x root 3 to get the E at each point
        set ans to scale theList by factor {1, 1, 1 } with offset theOffset
        set theList to { }
        repeat with j from 1 to 9
            set temp to item j of ans
            set x to root3 * (rms of (average temp))
            set theList to theList & {(temp & x) }
        end repeat
        set deviations to deviations & {rms of (average theList) } -- Add to
list of deviations are each level
    end repeat
    set deviations to rms of (average deviations) -- Get result across all levels
    -- Some routine can check the deviations to see if they are out of range.
    --    if deviations are out of range then do the following code.
    --        display dialog "The rms errors of repeat patches exceed
predefined limits. The number of incidents is:" & ~
    --            (first item of ans) buttons {"Stop", "Continue"} default
button 1 with icon caution
    --        if button returned of result is "Stop"then return 0
    -- Get the first 512 items of the labValues, then create the normalized data.
First do the colorimetric.
    set labValues to items 1 thru 512 of labValues
    -- Normalize to the Dmin point.
```

-continued

```
      set xyzData to transform labValues to XYZs with XYZn illum -- using
Sylvania D50
      set blackXYZ to first item of xyzData
      set whiteXYZ to last item of xyzData
      set labValues to transform xyzData to LABs with XYZn whiteXYZ
      set labValues to do black correction labValues ofendPoints {DMax:(first
item of labValues), DMin:(last item of labValues) }
      write map labValues increment by incrementList2 save to (file tInvIn1)
      write map (scale labValues by factor {652.8, 256.000094, 256.000094} with
offset {0, 32768, 32768})~
         increment by incrementList save to (file tA2B1)
      -- Invert this map with the default goal space. Save the result to disk.
      invert3D file:tInvIn1 save to file tB2A1 output gamut to file tGamutOut goal
space file tGoalSpace scale result by 257.0 ~
         message "Computing inverse colorimetric data" params
{smoothness:0.0, tolerance:0.1, iterations:5 }~
         protected points {{{1,9,9}, {0.0,0.0,0.0}}, {{17,9,9}, {1.0, 1.0,
1.0}}}
      -- Normalize to the Dmin preserving the lightness. This is for the perceptual
tags.
      set temp to item 2 of whiteXYZ
      set labValues to transform xyzData to LABs with XYZn {(item 1 of
whiteXYZ)/temp, 1.0, (item 3 of whiteXYZ)/temp }
      set labValues to do black correction labValues ofendPoints {DMax:(first
item of labValues), DMin:(last item of labValues)}
      write map labValues increment by incrementList2 save to (file tInvIn0)
      write map (scale labValues by factor {652.8, 256.000094, 256.000094} with
offset {0, 32768, 32768})~
         increment by incrementList save to (file tA2B0)
      -- Invert this map with the default goal space. Save the result to disk.
      invert3D file tInvIn0 save to file tB2A0 goal space file tGoalSpace scale
result by 257.0~
         protected points {{{1,9,9}, {0.0,0.0,0.0}}, {{17,9,9}, {1.0, 1.0,
1.0}}}~
         message "Computing inverse perceptual data"
      tell application "ProfileMaker"
         activate
         tell front document
            -- Add a copyright tag
            get (current date) as string
            set myYear to fourth word of result
            make new tag at end of profile 1 with properties
               {signature:copyrightTag, type:textType,
data:"Copyright" & myYear & ~
                  "Polaroid Corporation. All rights reserved."}
            make new tag at end of profile 1 with properties ~
               {signature:mediaWhitePointTag, type:XYZType,
data:whiteXYZ }
            make new tag at end of profile 1 with properties ~
               {signature:mediaBlackPointTag, type:XYZType,
data:blackXYZ }
            -- Make the AtoB tags. 2 is identical to 0.
            make new tag at end of profile 1 with properties ~
               {signature:AToB0Tag, type:lut16Type, data: {alias
tA2BInLut, ~
                  alias tA2B0, alias tNullLut3}}
            make new tag at end of profile 1 with properties ~
               {signature:AToB1 Tag, type:lut16Type, data:{alias
tA2BInLut, ~
                  alias tA2B1, alias tNullLut3}}
            make new tag at end of profile 1 with properties ~
               {signature:AToB2Tag, type:lut16Type, data:{alias
tA2BInLut, ~
                  alias tA2B0, alias tNullLut3}}
            -- Make the BtoA tags. 2 is identical to 0
            make new tag at end of profile 1 with properties ~
               {signature:BToA0Tag, type: lut16Type, data:{alias
tNullLut3, ~
                  alias tB2A0, alias tNullLut3}}
            make new tag at end of profile 1 with properties ~
               {signature:BToA1Tag, type:lut16Type, data: {alias
tNullLut3, ~
                  alias tB2A1, alias tNullLut3}}
            make new tag at end of profile 1 with properties ~
               {signature:BToA2Tag, type: lut16Type, data:{alias
tNullLut3, ~
                  alias tB2A0, alias tNullLut3}}
            -- Make the gamut tag. Its luts should be the same as the
BtoA0tag.
```

-continued

```
                make new tag at end of profile 1 with properties
                    {signature: gamutTag, type:lut16Type, data:{alias
tNullLut3, ~
                        alias tGamutOut, alias tNullLut1}}
                -- Modify the prismInformation tag
                tell application "ProfileMaker"
                    user
                    set theUser to name of result
                end tell
                set tmp to {{"script & scriptName & "(compute)", "ver." &
scriptVersion & ("ran" & ~
                    (current date) as text) & ",via ProfileMaker version"
& version of application "ProfileMaker" & ",by" & theUser & ~
                    ",dataset []P'"& dName & "[]P' of document []P'" & name
& "[]P'"}}
                -- This nextstatement would add the above text to the
PolaInformation tag (was called prism)
                -- tell p1ib to UpdatePrismInformation(tmp)
            end tell
        end tell
        -- clean up the temporary files.
        tell application "Finder"
            delete alias tInvIn0
            delete alias tInvIn1
            delete alias tA2B0
            delete alias tA2B1
            -- delete alias tA2B2 -- Not present yet
            delete alias tB2A0
            delete alias tB2A1
            -- delete alias tB2A2 -- Not present yet
            delete alias tGamutOut
        end tell
        beep
        display dialog ~
            "Computation Done. Eleven tags added or updated. Remember to
save your profile." buttons {"OK"} default button 1 with icon 1
        return 0
end compute
on validate( )
    -- This script verifies the operation of a current profile for a device. It must
be the profile embedded
    -- in the front most document of ProfileMaker.
    -- Get the path to the data folder. Load the libraries. Generate the dataset
names.
    tell application "Finder" to set tfolder to ((container of (path to application
"ProfileMaker")) as text) & "data:Output:"
    -- Check on the existence of previous datasets.
    tell front document of application "ProfileMaker"
        set enabled of every dataset to false
        try
            set enabled of every dataset whose state is validateCode to
true
        on error
        end try
        get every dataset whose enabled is true -- Should have a list of 3
datasets.
        set dsetCount to count result
        -- Make new datasets if required
        set nameList to {"Calculated", "Measured", "Adjusted"}
        set chkName to "AToB1 Check" -- Name of dataset we make for the
check, or have made for the check.
        if dsetCount is 0 then
            repeat with i from 1 to 3
                make new dataset at end ~
                    with properties ~
                    {type:Color Space, layout:{9, 9, 1}, patch
size:{40, 40}, color source: ~
                        {category:Import, name:(tfolder &
"Validate9x9v2.rgb") }, lab source: ~
                        {category:PR 650}, LUT source: ~
                        {category:Resource, name: "NULL"},
name: ~
chkName & item i of nameList,
state:validateCode }
                if dsetCount is 0 then set lab source of result to
{category:AToB1 Tag }
                set dsetCount to dsetCount + 1
            endrepeat
            return 0 -- User measures data. Runs routine again to finish
```

-continued

```
the analysis.
        endif
        -- There should be 3, enabled datasets at this point. Get them in an
ordered list by their names
        if dsetCount is not 3 then error "Wrong number of datasets!!"
        set dsetList to { }
        repeat with i from 1 to 3
            try
                set dsetList to (dsetList & (first dataset whose enabled
is true and name contains item i of nameList))
            on error
                error "The required datasets with proper names are not
present. Please check them."
            end try
        end repeat
        set lab of every patch of item 3 of dsetList to { }
        set labValues to lab of item 2 of dsetList
        tell profile 1 -- we should be able to get data either from the profile or
the document
            try
                set blackXYZ to data of first tag whose signature is
mediaBlackpointTag
                set whiteXYZ to data of first tag whose signature is
mediaWhitePointTag
            on error
                error "Cannot find media XYZ tags!"
            end try
        end tell
    end tell
    -- Normalize to the Dmin point.
    set xyzData to transform labValues to XYZs with XYZn illum -- using
Sylvania D50
    set labValues to transform xyzData to LABs with XYZn whiteXYZ
    set nLab to transform {blackXYZ, whiteXYZ} to LABs with XYZn
whiteXYZ
    set labValues to do black correction labValues of endpoints {DMax: (first
item of nLab), DMin:(last item of nLab)}
        tell front document of application "ProfileMaker"
            set lab of (item 3 of dsetList) to labValues
        end tell
        -- Now do the differences calculation.
        tell front document of application "ProfileMaker"
            set diffs to compare item 3 of dsetList to item 1 of dsetList
        end tell
        set diffs to average diffs
        tell front document of application "ProfileMaker"
            set strData to ("Validated on" & (current date) as text) & "by" &
"????" & ".Delta LabE stats: " & ~
                (diffs as text)
            repeat with |dset|in dsetList
                tell |dset|
                    -- get notes
                    set notes to strData
                end tell
            end repeat
            -- set notes of profile 1 to profileNotes
            -- Modify the prismInformation tag to reflect what has been done.
            return 0
        end tell
end validate
```

What is claimed is:

1. A method for use with a computer system of generating and maintaining a profile as a digital representation relating a first transform space to a second transform space, the method comprising the steps of:
   providing a profile generation environment;
   providing a profile viewing environment;
   providing a profile editing environment; and
   providing a profile validation environment.

2. The method of claim 1, further comprising the steps of allowing data processing modules to be added to said profile generation and validation environments, and allowing tag structures to be added to said profile viewing and editing environments.

3. The method of claim 1, wherein the profile comprises first, second and third header and tag information, and the step of providing a profile generation environment comprises:
   selecting at least one script from a list of scripts, said selected at least one script providing a set of instructions for generating the profile; and
   executing said selected at least one script for automatically generating the first header and tag information, interactively generating the second header and tag information, importing both first transform space data corresponding to the first transform space and second transform space data corresponding to the second transform space, determining the third header and tag information in response to both said first transform space data and said second transform space data, and storing said first, second and third header and tag information in the profile.

4. The method of claim 3, wherein if the first transform space corresponds to a source device, then the first transform space is device-dependent color space and the second transform space is device-independent color space.

5. The method of claim 4, further comprising the step of acquiring a target image having color patches and displaying both said color patches and averaging areas within said color patches, and interactively sizing and positioning said averaging areas for averaging color patch data in said device-dependent color space as average color values of said averaging areas.

6. The method of claim 3, wherein if the second transform space corresponds to a destination device, then the first transform space is device-independent color space and the second transform space is device-dependent color space.

7. The method of claim 6, further comprising the step of rendering to said destination device an image having color patches defined by color patch data in said device-dependent color space.

8. The method of claim 1, wherein the step of providing a profile viewing environment comprises:
   selecting at least one script from a list of scripts, said selected at least one script providing a set of instructions for generating the profile viewing environment; and
   executing said selected at least one script for selecting a profile to be viewed, opening said selected profile, displaying a list of headers and tags associated with said selected profile, selecting at least one of said headers and tags for display; and displaying said selected headers and tags.

9. The method of claim 1, wherein the step of providing a profile editing environment comprises:
   selecting at least one script from a list of scripts, said selected at least one script providing a set of instructions for generating the profile editing environment; and
   executing said selected at least one script for selecting a profile to be edited, opening said selected profile, displaying a list of headers and tags associated with said selected profile, selecting and displaying at least one of said headers and tags for editing; editing said selected headers and tags, and saving said edited headers and tags into said selected profile.

10. A computer operated system for generating and maintaining a profile as a digital representation relating a first transform space to a second transform space, the system comprising:
   a profile generation environment;
   a profile viewing environment;
   a profile editing environment; and
   a profile validation environment.

11. The system of claim 10, further comprising means for allowing data processing modules to be added to said profile generation and validation environments, and for allowing tag structures to be added to said profile viewing and editing environments.

12. The system of claim 10, wherein the profile comprises first, second and third header and tag information, and said profile generation environment comprises:
   means for selecting at least one script from a list of scripts, said selected at least one script providing a set of instructions for generating the profile; and
   means for executing said selected at least one script for automatically generating the first header and tag information, interactively generating the second header and tag information, importing both first transform space data corresponding to the first transform space and second transform space data corresponding to the second transform space, determining the third header and tag information in response to both said first transform space data and said second transform space data, and storing said first, second and third header and tag information in the profile.

13. The system of claim 12, wherein if the first transform space corresponds to a source device, then the first transform space is device-dependent color space and the second transform space is device-independent color space.

14. The system of claim 13, further comprising means for acquiring a target image having color patches and for displaying both said color patches and averaging areas within said color patches, and for interactively sizing and positioning said averaging areas for averaging color patch data in said device-dependent color space as average color values of said averaging areas.

15. The system of claim 12, wherein if the second transform space corresponds to a destination device, then the first transform space is device-independent color space and the second transform space is device-dependent color space.

16. The system of claim 15, further comprising means for rendering to said destination device an image having color patches defined by color patch data in said device-dependent color space.

17. The system of claim 10, wherein said profile viewing environment comprises:
   means for selecting at least one script from a list of scripts and for allowing said selected at least one script to provide a set of instructions for generating the profile viewing environment; and
   means for executing said selected at least one script to select a profile to be viewed, open said selected profile, display a list of headers and tags associated with said selected profile, select at least one of said headers and tags for display; and display said selected headers and tags.

18. The system of claim 10, wherein said profile editing environment comprises:
   means for selecting at least one script from a list of scripts and allowing said selected at least one script to provide a set of instructions for generating the profile editing environment; and
   means for executing said selected at least one script to select a profile to be edited, open said selected profile, display a list of headers and tags associated with said selected profile, select and display at least one of said headers and tags for editing; edit said selected headers and tags, and save said edited headers and tags into said selected profile.

19. A computer-readable medium having contents for causing a computer system to generate and maintain a profile defined as a digital representation relating a first transform space to a second transform space by providing a profile generation environment, a profile viewing environment, a profile editing environment, and a profile validation environment.

20. The computer-readable medium of claim 19, wherein the profile comprises first, second and third header and tag information, and said profile generation environment is provided by steps for:
   selecting at least one script from a list of scripts, said selected at least one script providing a set of instructions for generating the profile; and executing said selected at least one script for automatically generating the first header and tag information, interactively generating the second header and tag information, importing both first transform space data corresponding to the first transform space and second transform space data corresponding to the second transform space, determining the third header and tag information in response to both said first transform space data and said second transform space data, and storing said first, second and third header and tag information in the profile.

21. The computer-readable medium of claim 20, wherein if the first transform space corresponds to a source device, then the first transform space is device-dependent color space and the second transform space is device-independent color space.

22. The computer-readable medium of claim 21, further providing the steps of acquiring a target image having color patches and displaying both said color patches and averaging areas within said color patches, and interactively sizing and positioning said averaging areas for averaging color patch data in said device-dependent color space as average color values of said averaging areas.

23. The computer-readable medium of claim 20, wherein if the second transform space corresponds to a destination device, then the first transform space is device-independent color space and the second transform space is device-dependent color space.

24. The computer-readable medium of claim 23, further providing the step of rendering to said destination device an image having color patches defined by color patch data in said device-dependent color space.

25. The computer-readable medium of claim 19, wherein the profile viewing environment is provided by the steps of:

selecting at least one script from a list of scripts, said selected at least one script providing a set of instructions for generating the profile viewing environment; and executing said selected at least one script for selecting a profile to be viewed, opening said selected profile, displaying a list of headers and tags associated with said selected profile, selecting at least one of said headers and tags for display; and displaying said selected headers and tags.

26. The computer-readable medium of claim 19, wherein the profile editing environment is provided by the steps of:

selecting at least one script from a list of scripts, said selected at least one script providing a set of instructions for generating the profile editing environment; and executing said selected at least one script for selecting a profile to be edited, opening said selected profile, displaying a list of headers and tags associated with said selected profile, selecting and displaying at least one of said headers and tags for editing; editing said selected headers and tags, and saving said edited headers and tags into said selected profile.

27. For use in a computer system, a computer-readable memory device encoded with a data structure for generating and maintaining a profile as a digital representation relating a first transform space to a second transform space, the data structure comprising entries for providing a profile generation environment, providing a profile viewing environment, providing a profile editing environment and providing a profile validation environment.

* * * * *